United States Patent

Ukegawa et al.

[11] Patent Number: 6,017,172
[45] Date of Patent: Jan. 25, 2000

[54] CERAMIC INSERT FOR USE WITH CLAMP TYPE CUTTING TOOL

[75] Inventors: Harutoshi Ukegawa; Matsuo Higuchi; Shingo Hirota; Nobuyuki Kitagawa, all of Itami, Japan

[73] Assignee: Sumitomo Electric Industries, Ltd., Osaka, Japan

[21] Appl. No.: 09/150,037

[22] Filed: Sep. 9, 1998

[30] Foreign Application Priority Data

Sep. 9, 1997 [JP] Japan .................................. 9-243598

[51] Int. Cl.⁷ ...................................... B23B 27/22
[52] U.S. Cl. ........................... 407/113; 407/119; 407/118
[58] Field of Search .................................. 407/113, 119, 407/118, 66, 107, 111

[56] References Cited

U.S. PATENT DOCUMENTS

| | | | |
|---|---|---|---|
| 5,447,208 | 9/1995 | Lund et al. | 407/119 |
| 5,628,590 | 6/1999 | Beeghly | 407/114 |
| 5,836,723 | 11/1998 | Von Hass et al. | 407/113 |

FOREIGN PATENT DOCUMENTS

| | | |
|---|---|---|
| 0 075 177 B1 | 3/1983 | European Pat. Off. . |
| 3342-981 | 6/1985 | Germany ............... 407/107 |
| 51-24626 | 6/1976 | Japan . |
| 58-59705 | 4/1983 | Japan . |
| 58-59706 | 4/1983 | Japan . |
| 6-505922 | 7/1994 | Japan . |

*Primary Examiner*—Daniel W. Howell
*Assistant Examiner*—Mark Williams
*Attorney, Agent, or Firm*—McDermott, Will & Emery

[57] ABSTRACT

The ceramic insert made from a silicon nitride ceramic material and formed with a recess for fastening in the center of its rake face. The recess has a surface roughness Rmax not exceeding 4 μm. The angle between a side face of the recess and a centerline perpendicular to the rake face of the insert is 50–70 degrees. The ratio of the diameter of the recess to the diameter of a circle inscribing the perimeter of the rake face is 30–85%. The recess has a flat or curved bottom. The connecting portion between the side face and the bottom of the recess forms a smoothly curved surface.

6 Claims, 2 Drawing Sheets

CERAMIC INSERT FOR USE WITH CLAMP TYPE CUTTING TOOL

BACKGROUND OF THE INVENTION

The present invention relates to a ceramic insert for use with a clamp type cutting tool used mainly for high-speed cutting of cast iron and having an insert holder for clamping an insert.

Conventional cutting tool inserts for machining automotive and other machine parts include ones made of WC—Co material, called "cemented carbide", or TiN—Co material called "cermet", and ones optionally having a ceramic film formed on the substrate. Requirements for higher efficiency machining of such inserts are growing especially in recent years. Also durable cutting tools are desired which withstand high-temperature environments during machining, and allow machining at high feed and large depth of cut.

Under such machining conditions, tools are typically exposed to air heated to 1000° C. or higher. At such high temperatures, cutting tools made of cermet tend to suffer a marked drop in oxidation resistance and mechanical strength. Thus, these tools are difficult to use stably. Cutting tools made of silicon nitride ceramics containing silicon nitride or SIALON as its main component, are gathering much attention these days because of their high strength and oxidation resistance at high temperatures. For example, a high-strength, high-toughness silicon nitride ceramic insert is disclosed in Japanese PCT patent publication 6-505922. This insert has a through hole formed in the center of its rake face to fasten the insert to a holder.

One problem with such silicon nitride ceramic inserts is that they tend to chip during heavy-load machining due to low toughness, though their high-temperature strength (or bending strength) is high. To prevent chipping, it is necessary to prevent the inserts from shifting during machining, and various attempts have been made to solve this problem. For example, in the above publication, a through hole formed in the rake face in the thickness direction is used to fasten the insert to the holder. But the through hole itself can be a cause of decreased strength of the insert.

To solve this problem, European Patent No. 0075177 and its corresponding Japanese patent publications 58-59705 and 58-59706 disclose an insert having a recessed portion formed in the rake face to fasten the insert by pressing its recessed portion from above with a holder presser with a clamp arm. Because the insert is made from a material that is difficult to machine, not so high dimensional accuracy is required for the recessed portion. The presser is pressed at one point against the inner wall of the recess with the tension in the longitudinal direction of the arm of the presser body to keep the insert stationary. According to these publications, the presser tip has a semicircular vertical section, and the recess formed in the insert rake face has a gourd-shaped, oval or star-shaped section for one-point contact with the presser tip. But in this arrangement, if the contact point shifts due to heavy load during high-speed machining or variations in size of presser tip, the insert may be damaged due to unstable support of the insert or stress concentration on the support point. Similar trouble may occur if minuscule vibrations are transmitted to the entire holder from an old machining equipment.

In examined Japanese utility model publication 51-24626, similar insert mounting arrangements are disclosed, in which the insert has an inverted conical recess and the presser is pressed against one side of the recess (Example 1). There is also another example in which a through hole for fastening is further formed in the bottom of the inverted conical recess (Example 2). In these examples, the insert recess inner surface may be a rough surface formed only by sintering and having a roughness value Rmax of 10 $\mu$m or over. But even in these examples, it is difficult to reliably keep the insert stationary under heavy load during high-speed machining. In Example 1, since the inclined surface of the recess of is rough, it is difficult to hold the insert stably under a heavy load for a long time. In Example 2, besides this problem, the through hole tends to lower the strength of the insert. Further, if the inclination angle of the side of the conical recess is small, the component of the clamping force for stopping the shift of the insert tends to decrease, making it more difficult to keep the insert stationary especially during high-speed machining.

A main object of the present invention is to provide a silicon nitride ceramic insert which is free of the above-listed problems.

SUMMARY OF THE INVENTION

According to the present invention, there is provided a ceramic insert formed with a recess in the center of a rake face of the insert, the insert being made from a silicon nitride ceramics, the recess having a surface roughness value Rmax not exceeding 4 $\mu$m, the angle between a side face of the recess (the "side face of the recess" as used in the present invention refers to the side of the recess indicated by numeral 3 in FIG. 1) and a centerline (numeral 4 of FIG. 1) perpendicular to the rake face of the insert being 50–70 degrees, the ratio of the diameter of the recess to the diameter of a circle inscribing the perimeter of the rake face (hereinafter referred to as "recess diameter ratio") is 30–85%, that the recess has a flat bottom, and the connecting portion between the side face and the bottom of the recess forming a smoothly curved surface. FIG. 1A schematically shows this example.

The ceramic insert of the present invention may be made from the same material as above and have a recess having a curved bottom.

The insert may have a hard film formed on at least part of the surface including the recess for clamping. The hard film may be made from a ceramic material, diamond-like carbon or diamond, because these materials are less likely to deteriorate in hardness and oxidation resistance in hot air heated to more than 1000° C. Needless to say, irrespective of whether such a film is formed or not, the recess should be of such a shape as defined above.

The method for manufacturing the ceramic insert according to the present invention includes the steps of molding the insert with a recess to a shape analogous to the final shape by molding a mixture of silicon nitride powder and sintering assistants, sintering the molded article, and finishing at least the sintered recess surface to a surface roughness Rmax of 4 $\mu$m or less.

Other features and objects of the present invention will become apparent from the following description made with reference to the accompanying drawings, in which:

DETAILED DESCRIPTION OF THE PREFERRED EMBODIMENT

According to the present invention, the cutting insert is made from a silicon nitride ceramics. This ceramic insert may be manufactured by the same method as used in manufacturing a sintered product of silicon nitride ceramics, e.g. by adding sintering assistant powder such as $Y_2O_3$, $Al_2O_3$, $ZrO_2$ or MgO to a commercially available silicon nitride powder and molding and sintering it. A silicon nitride sintered material used in the invention may be one having a porosity of 10% or less, an average particle diameter of 10 μm or less and a three-point bending strength of 800 Mpa or over. Preferable silicon nitride ceramic materials include one having its grain boundary layer crystallized, one having a reduced amount of grain boundary layer like composite SIALON, and one reinforced with ceramic fibers (whiskers having high toughness at high temperature such as SiC and TiC) and thus high in high-temperature strength. By selecting, from among these materials, a material having an average particle diameter not exceeding 4 μm, a three-point bending strength at normal temperature of 1500 MPa or over, a three-point bending strength at 1000° C. of 800 MPa or over, a Vickers hardness at 1000° C. of 8 Gpa or over, and a fracture toughness $K_{1C}$ at normal temperature of 5 $MPam^{1/2}$ or over, machining with higher speed will become possible and the insert durability will be improved.

Figure 4:
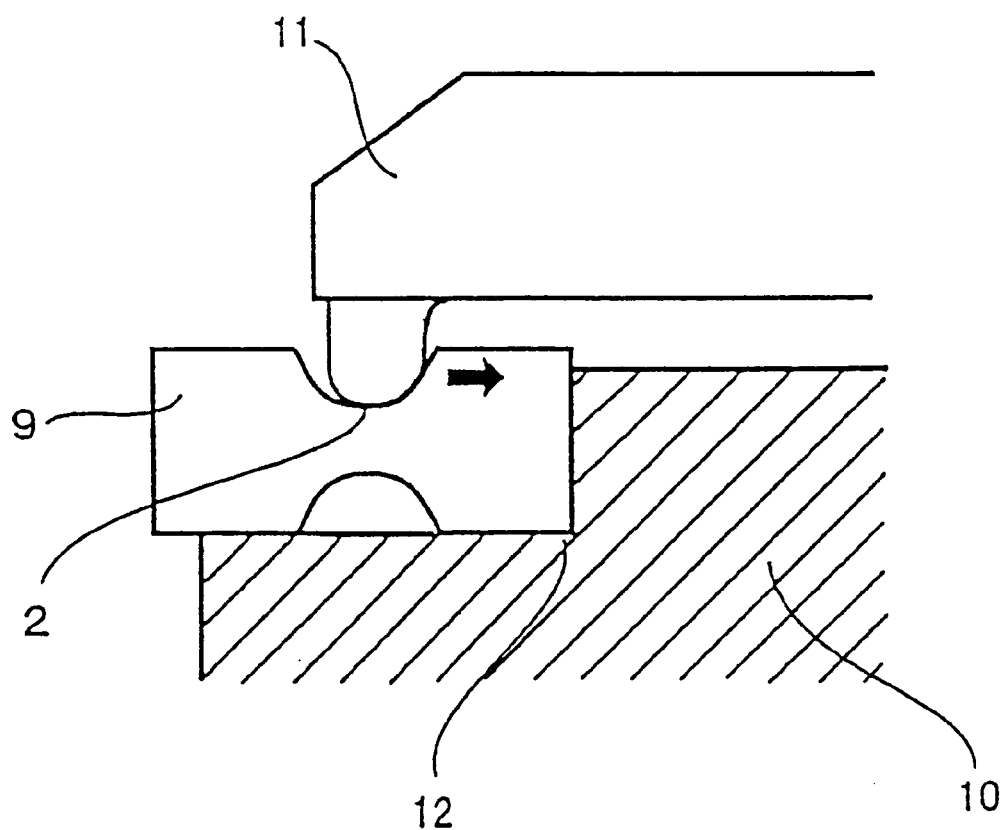
FIG. 4 is a schematic view showing how the cutting insert is clamped.

FIG. 4 schematically shows the insert clamp portion of the cutting tool. As shown, the insert 9 is formed with a recess 2 for clamping it. The insert 9 is pressed against a cut-out portion 12 of a clamp type insert holder 10 by a presser 11 of the insert holder 10 in the recess 2 and fixed in position. The presser 11 applies stress to the recess surface of the insert 9 from above and toward the holder body (in the direction of arrow).

Figure 1A:
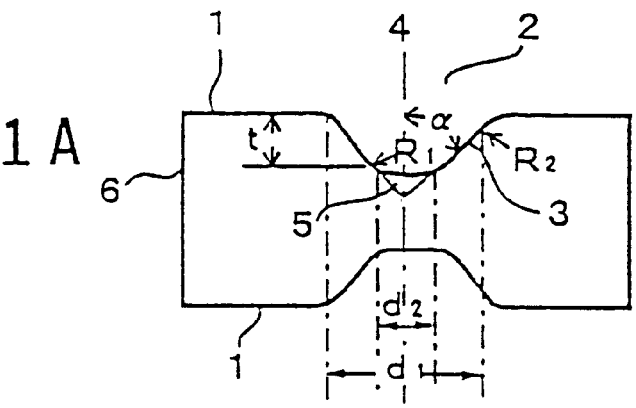
FIG. 1A is a sectional view of a cutting insert embodying the present invention.
Figure 1B:
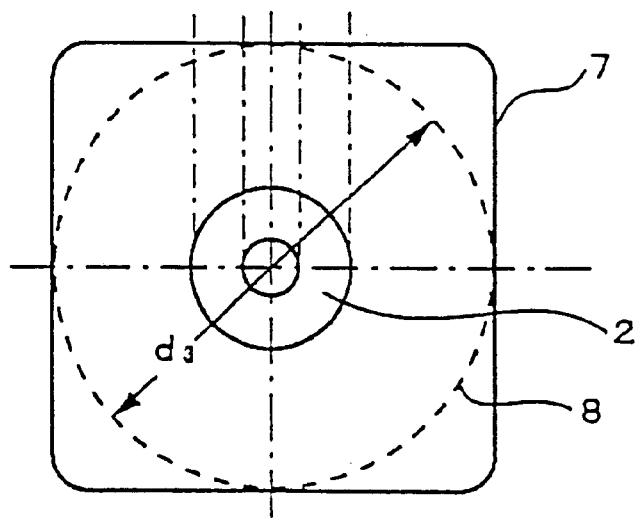
FIG. 1B is a plan view of the same.
Figure 2A:
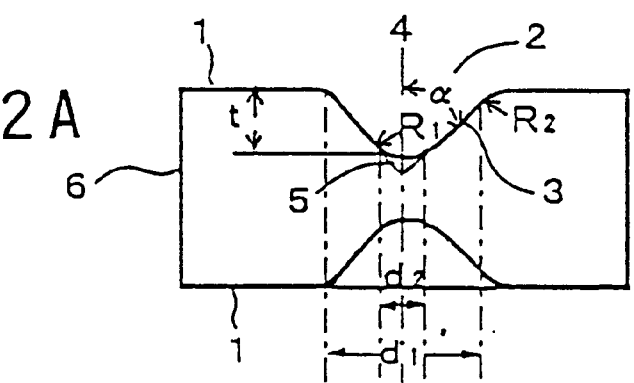
FIG. 2A is a sectional view of another cutting insert embodying the present invention.

FIGS. 1A, 1B, 2A and 2B schematically show this type of cutting inserts having different shapes. The insert shown in FIG. 1A is called an S type and has a recess having a flat bottom in its bottom surface. The insert shown in FIG. 2A is called a C type and has a recess with a spherical bottom. In the figures, the insert has a rake face 1, a recess 2 for clamping the insert, an inclined inner surface 3 of the recess, a centerline 4 extending perpendicularly to the rake face, the bottom 5 of the recess, a flank 6, and a circle 8 inscribing the outer contour 7. α is the angle between the recess inner surface 3 and the centerline 4 of the rake face, d1 is the diameter of recess in the rake face, d2 is the dimension of the recess bottom 5 (diameter if the bottom is circular; maximum dimension along line passing the center of recess bottom if noncircular), d3 is the diameter of the circle inscribing the insert contour, t is the depth of the recess, and R1 is the radius of curvature at the connecting portion between the bottom and side of recess. The portion R2, which is a connecting portion between the rake face and the recess side, may be a curve or not.

Figure 2B:
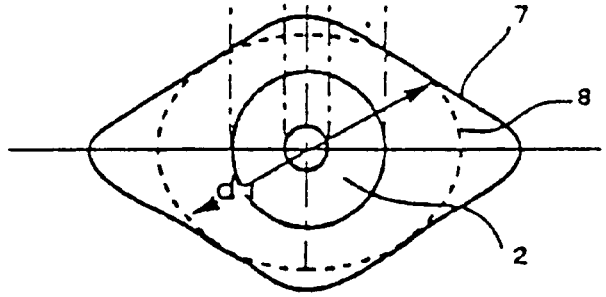
FIG. 2B is a plan view of the same.

In these embodiments, the recess has a circular section as shown in FIGS. 1B and 2B. But as long as the recess has a straightly inclined side, the recess section is not limited to circular but may be of any shape isotropic with respect to the centerline 4, such as a square, a regular hexagon, any other regular polygon, and a petal shape. Preferably, each corner and bend are smoothly curved to ensure sufficient strength and toughness for the insert to withstand heavy load during high-speed machining. If the recess has a square section, each corner has preferably as large radius of curvature as possible to prevent stress concentration on the corners during machining.

Figure 3A:
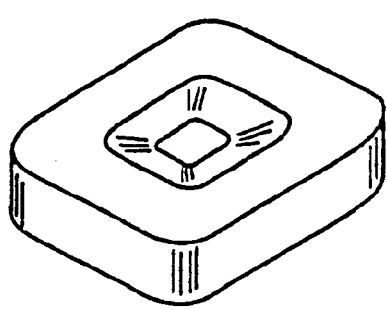
FIGS. 3A and 3B are perspective views of other embodiments.
Figure 3B:
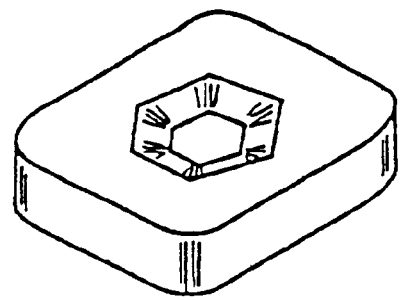

According to the present invention, if the recess has such a sectional shape, the recess diameter on the rake face and the bottom diameter are the maximum dimension cut along line passing the center of each shape, which is the maximum diagonal e.g. in the case of a regular polygon. But from both manufacturing and functional viewpoints, the sectional shape of recess should preferably be a circle. Recesses having square and regular hexagonal sections are shown in FIGS. 3A and 3B, respectively.

As shown in the Figures, the silicon nitride ceramic insert according to the present invention is formed with an inverted conical recess 2 having an inclined side in both of the top and bottom rake face 1 at its center. The recesses of the insert according to the present invention has an isotropic, inverted conical shape, as mentioned above. With this arrangement, the insert can be supported more stably than with the prior art arrangement. With this arrangement, even if the contact point with the insert shifts due to variations in the shape of the tip of the holder presser or due to long use, the insert can be held stably because the presser is in contact with the insert at two or more points.

Such a recess is difficult to form in a sintered material. Thus, before sintering, a recess analogous in shape to the intended recess is formed during powder molding taking into account the rate of shrinkage during sintering. It would be also possible to form such a recess after powder molding by cutting. But this not only adds to the trouble for machining but will increase the possibility of chipping at recess corners and edges because the molded article is brittle. Loss of material powder is another problem. Further, in this case, the surface of the recess has to be smooth.

Thus, the surface of the recess of the insert according to the present invention should have a surface roughness Rmax 4 μm or less. If the surface roughness is higher than this value, the insert may crack and chip due to stress concentration locally on the recess surface of the insert under heavy load during high-speed machining. Thus, an insert with a sintered but not finished skin is not usable. After sintering, at least the recess surface has to be finished by barreling or honing.

The connecting portions of the recess should be formed into analogous shape in a mold during powder molding taking into account the shrinkage rate during sintering. With this arrangement, although there may be certain variations in curve dimensions of the individual connecting portions, these portions may sometimes be used with sintered but not finished skin. If the connecting portion between the rake face and the recess side face is edgy at the completion of powder molding, cracks may start from the recess edge due to heating during sintering. It is thus preferable to form a curved surface with a mold during powder molding. This portion is usually removed in the final thickness adjusting step but may remain.

With the insert of the present invention, as mentioned earlier, the angle α between the centerline 4 of the rake face 1 and the side face 3 of the recess should be 50–70 degrees. If this angle is less than 50 degrees, the vertical component force applied by the presser will decrease to such an extent that the contact point of the presser may shift under load during machining. If greater than 70 degrees, secure tightening in a vertical direction will become difficult due to reduced component force from the presser toward the holder body. In either case, the insert cannot be held stably in a fixed position.

The ratio of the diameter d1 of the recess on the rake face to the diameter d3 of the circle inscribing the chip contour, i.e. d1/d3 should be controlled within the range of 30–85%. If this ratio is less than 30%, the insert pressing area would decrease, resulting in insufficient pressing force. If over 85%, the wall portion of the insert around the recess would become so thin that the strength of the insert would become insufficient compared to applied stress. In either case, the insert might be broken during machining. Preferably, this ratio should be controlled within the range of 55–75%.

The bottom of the recess of the insert according to the present invention should be flat or curved. The diameter or dimension d2 of the bottom and the depth t of the recess should be determined taking into account the relation between the insert thickness and the angle α between the rake face 1 and the recess side 3. Even if the bottom is curved, it should be connected to the connecting portion by a continuous smoothly curved surface.

The connecting portion between the bottom and the side of the recess of the insert according to the present invention (portion R1 in FIG. 1A) should be a smoothly continuous curved surface. If this portion forms an arc as viewed in side section, its radius of curvature at R1 should preferably be about 0.2–5 mm though this value varies with the size of the insert and the dimension (or diameter) of the bottom. But this value has to be smaller than the dimension (or diameter) of the bottom. Such smooth connection prevents stress concentration during machining and thus damage to the insert.

The insert according to the present invention may be made solely from a silicon nitride ceramics. But to improve the wear resistance of the insert, a hard film may be formed on at least part of its surface including the recess. As mentioned above, according to the present invention the hard film should be made from e.g. ceramic, diamond-like carbon or diamond because these materials are less likely to deteriorate in hardness and oxidation resistance in hot air higher than 1000° C. This kind of film may comprise a single layer made from a single kind of material or a plurality of laminated layers each made from a different material from the other layers. This film may be formed by vapor phase deposition such as CVD or PVD or any other film forming method.

EXAMPLE 1

As a starting material, 95 wt % silicon nitride powder having an average particle diameter of 0.2 $\mu$m and a specific surface area BET of 15 m$^2$/g and containing an $\alpha$-crystal phase content of 95%, and 3 wt % aluminum oxide powder and 2 wt % yttrium oxide powder as sintering assistants, both having an average particle diameter of 0.5 $\mu$m were weighed out, an organic binder was added thereto, and they were wet-mixed in ethyl alcohol. The slurry thus obtained was spray-dried to produce pelletized powder having a particle diameter of 10–80 $\mu$m.

From this pelletized powder, S type and C type inserts formed with recesses of various shapes in the top and bottom rake faces were molded under the pressure of 1 ton/cm$^2$. After degreasing the organic binder in the molded bodies, they were sintered for three hours at 1900° C. under the nitrogen gas pressure of 6 atm. Then, HIP (hot isostatically pressing) was conducted for one hour at 1800° C. under the nitrogen gas pressure of 200 atm. to produce sintered inserts (hereinafter referred to as "process-sintered members"). Further, these sintered specimens were separately processed under the same conditions and their structures and physical values were evaluated. They showed a porosity not exceeding 1% (i.e. 99% or higher in relative density), an average particle diameter of 3 $\mu$m, a three-point bending strength of 1800 MPa at normal temperature and 900 MPa at 1000° C., a Vickers hardness of 9 GPa at 1000° C., and a fracture toughness $K_{1C}$ at normal temperature of 7 MPam$^{1/2}$.

The circles inscribing the contours of these sintered inserts all had a diameter of 12.70 mm, and their nose radii were all 1.2 mm. The angle $\alpha$ between the side face of the recess formed in the center of the rake face of each insert and the centerline of the insert extending perpendicularly to the rake face was 60 degrees. These sintered products were then barrel-polished for a half hour using alumina and zirconia abrasive grains. As a result, the surface roughness of the recess was finished to Rmax 2.1 $\mu$m, and the side face of each recess was smoothly connected to its bottom with a radius of curvature of about 1 mm.

Table 1 shows the shapes of 11 kinds of C and S type inserts (having the same recess diameters and recess diameter ratios) manufactured in the above manner. Any of the specimens had a recess bottom having a diameter of about 2 mm. (in S type, the circular flat surface had a diameter of about 2 mm, and in C type, the connecting portion between the recess inner side and the circular portion had a diameter of about 2 mm.)

S type and C type inserts having the same shapes as the specimen Nos. 6 and 10 were formed from a commercial silicon nitride ceramic material. This material had a porosity of 5%, an average particle diameter of 6 $\mu$m, a three-point bending strength at normal temperature of 1200 MPa, and a fracture toughness value $K_{1C}$ of 4 MPam$^{1/2}$.

Then, the rake faces of these respective specimens were polished to a flat surface with a thickness between the rake faces of 7.94 mm, the width of the chamfer to 0.15 mm, and the angle of the chamfer with respect to the rake face to 20 degrees. A wet-cutting test was conducted under the following conditions (test conditions 1).

workpiece: FC250 cutting speed: 500 m/min.

feed rate: 0.4 mm/rev.

depth of cut: 2.0 mm

The holder for holding each insert was a CCBNR2525M12-1 X7 type. Using each insert, one side of each of 30 disk-shaped FC250 workpieces was machined.

With an insert having a recess sectional shape of specimen No. 1, the insert shifted during the test for both S and C types. Compared with other specimens, the insert holding stability was inferior. When a plurality of the corners were used on the same insert, one corner chipped after the 30 parts had been machined. Thus, the machining repeating accuracy (i.e. dimensional variations after machining) was inferior compared with the articles of the present invention. The S and C type inserts having the shape of specimen No. 11 chipped at edges when only a small number of parts had been machined. On the other hand, S and C type inserts of specimen Nos. 2–10 according to the present invention (including those having the same shapes as specimen Nos. 6 and 10 formed from the abovementioned commercial sintered body material) were superior in holding stability by the holder and the inserts never shifted during machining. Even when a plurality of corners were used, the edges never chipped. Machining repeating accuracy was also high.

Further, higher-speed, heavier-load machining test was conducted for S and C type inserts of specimen Nos. 2–10 according to the present invention (test conditions 2). In this test, the cutting speed and the feed rate were increased to 750 m/min. and 0.65 mm/rev. respectively. The machining test was conducted using the same workpieces with the same depth of cut under the same holding/fixing conditions.

With inserts of Specimen Nos. 2–4, 9 and 10, when the four corners of each insert were used one after another, the insert slightly shifted during cutting with the last two or one corner, and abnormal wear of the insert was observed. But with process-sintered inserts of Specimen Nos. 5–8, the inserts never shifted during cutting with any of the four corners, and the four corners were worn uniformly and cleanly. For inserts of Specimen Nos. 6 and 10 made from the above commercial material, when the state of wear was observed after all of the 30 parts had been machined, the amount of wear of these inserts was about twice as large as that of the inserts of the same shape and made from the above process-sintered material, though no uneven wear due to shift of the inserts was observed at the corners.

EXAMPLE 2

S and C type inserts were made from the same process-sintered material and commercial materials as used in Example 1 to an insert contour inscribing circle diameter of 12.7 mm, a recess diameter of 7.60 mm, i.e. a recess section ratio of 60%, and the angle α between the centerline perpendicular to the rake face and the recess side face varied in six stages as shown in Table 2. The inserts made of process-sintered material were prepared in substantially the same manner as those of Example 1. Like Example 1, molds each corresponding to the shape of each recess were used so that they would have dimensions near the final shapes after sintering except their portions requiring finish polishing. For inserts made from a commercial material, only those having the shapes of Specimen Nos. 13 and 16 in Table 2 were prepared.

Then, the thus prepared insert-shaped sintered members were finished by barrel polishing for one hour under the same conditions as in Example 1. After finishing, the surface roughness Rmax of the recess of any insert was 3.3 μm. The recess side face and bottom were connected together smoothly with a radius of curvature of about 1.5 mm. Like Example 1, for both S and C type insert specimens, the recess bottom diameter was about 2 mm.

Then, the top and bottom rake faces of these insert specimens were finished to the same thickness and chamfer size as those in Example 1, and machining test was conducted under the test conditions 1 and 2 in Example 1. As a result, that of Specimen 12 was greater in the depth of the recesses formed in the top and bottom rake faces than the others. Although the recess bottom was smoothly connected to the recess side wall, the insert broke during machining due to cracks developed near the recess bottom. The insert of Specimen No. 17 shifted and its edge chipped during machining. In contrast, inserts of Specimen Nos. 13–16 (including those made from a commercial material) never shifted during cutting. Dimensional variations of workpieces were small even when a plurality of corners were used in the same insert. Thus, there was no problem with the repeating machining accuracy.

Further, like Example 1, inserts of Specimen Nos. 13–16 (including those made from a commercial material) were subjected to a machining test under the test conditions 2. As a result, any of process-sintered inserts of Specimen Nos. 13–16 never shifted during cutting with any of their four corners. Also, the four corners were worn uniformly. For inserts of Specimen Nos. 13 and 16 made from the above commercial material, when the state of wear was observed after all of 30 parts had been machined, the amount of wear of these inserts was about 1.5 times as large as that of inserts of the same shape and made from the process-sintered material, though no uneven wear due to shift of the inserts was observed at the corners.

EXAMPLE 3

Specimens having S and C type insert shapes of Specimen No. 6 of Example 1 and Specimen No. 15 of Example 2 were finished to three different surface roughness values Rmax of 4 μm, 5 μm and 5.5 μm by changing the barreling conditions for Example 1, and machining test was conducted under the test conditions 1 of Example 1. The specimen having an Rmax value of 4 μm was as stable as Specimen 6 of Example 1 during machining. But for the specimens having Rmax values of 5 μm and 5.5 μm, machining became impossible when about 20 parts had been machined due to cracks developed near the clamp point.

EXAMPLE 4

C type inserts were prepared which were made from the same process-sintered material as used in Example 1 and had a recess surface roughness Rmax of 3 μm, a recess diameter of 10.78 mm, an angle between the centerline perpendicular to the rake race and the recess side face of 70 degrees, and a thickness of 8.14 mm. Inserts were prepared in which the connecting portions between the recess bottom and the side face and between the rake face and the recess side face were formed into smoothly curved surfaces both having radii of curvature of 0.5 mm, 2.0 mm, 3.0 mm, 5.0 mm and 6.5 mm.

These inserts were machined to a thickness of 7.94 mm and they were fixed in position by the same clamp type holders as used in EXAMPLE 1, and machining test was conducted under the test conditions 1 and 2 of Example 1. The inserts having radii of curvature of 0.5 mm, 2.0 mm, 3.0 mm and 5.0 mm were stably fixed under any test conditions, and the machining results were good. But for the insert having a radius of curvature of 6.5 mm, the chip holding portion slightly shifted and its edge chipped while the 30th, i.e. last part was being machined under the test condition 2.

EXAMPLE 5

C type insert made from a machined process-sintered material of Specimen 6 of Example 1 were prepared. The recess of this specimen had a surface roughness Rmax of 2.1 μm. A coating layer of TiN and $Al_2O_3$ having a thickness of 2 μm was formed on its entire surface by CVD. The coating layer had a uniform thickness over the entire surface of the recess. The surface had a surface roughness Rmax of 2 μm. The insert's final shape was substantially the same as that of Specimen 6 as in Example 1 at every portion thereof. This insert was subjected to a cutting test under the test conditions 1 and 2 as in Example 1. As a result, the film never peeled and the layer surface was worn uniformly. Thus, the results were substantially the same as with Specimen 6 of Example 1. This ceramic-coated insert had improved wear resistance, and the final amount of wear at the edge was ½ in comparison with silicon nitride ceramic surface of Specimen 6.

According to the present invention, in a clamp type cutting tool in which a tool insert is fastened by clamping to a holder with a presser, the insert can be clamped with higher stability during cutting by means of an improved fixing portion, so that machining is possible with high speed, high-efficiency, and high repeating machining accuracy, which was impossible with conventional ceramic tool inserts.

TABLE 1

| Specimen number | Recess diameter dl (mm) | Ratio of diameter (%) |
| --- | --- | --- |
| *1 | 2.54 | 20 |
| 2 | 3.90 | 31 |
| 3 | 5.10 | 40 |
| 4 | 6.73 | 53 |
| 5 | 7.00 | 55 |
| 6 | 7.60 | 60 |
| 7 | 8.90 | 70 |
| 8 | 9.55 | 75 |
| 9 | 9.75 | 77 |
| 10 | 10.50 | 83 |
| *11 | 11.10 | 87 |

*comparison example

TABLE 2

| Specimen number | Angle α (in degree) |
| --- | --- |
| *12 | 47 |
| 13 | 50 |
| 14 | 55 |

TABLE 2-continued

| Specimen number | Angle α (in degree) |
|---|---|
| 15 | 60 |
| 16 | 70 |
| *17 | 73 |

*comparison example

What is claimed is:

1. A ceramic insert for use with a clamp type cutting tool, said ceramic insert having a rake face and formed with a recess in the center of said rake face, said insert being made from a silicon nitride ceramics, said recess having a surface roughness Rmax not exceeding 4 μm, the angle between a side face of said recess and a centerline perpendicular to the rake face of said insert being 50–70 degrees, the ratio of the diameter of said recess to the diameter of a circle inscribing the perimeter of said rake face is 30–85%, and the connecting portion between said side face and said bottom of said recess forming a smoothly curved surface.

2. A ceramic insert as claimed in claim 1 wherein said ratio is 55–75%.

3. A ceramic insert as claimed in claim 1 wherein the connecting portion between said smoothly curved surface has a radius of curvature of 0.2–5 mm.

4. A ceramic insert as claimed in claim 1 wherein a hard film is formed on at least part of the surface including said recess.

5. A ceramic insert as claimed in claim 1 wherein the bottom of said recess is flat.

6. A ceramic insert as claimed in claim 1 wherein the bottom of said recess is curved.

* * * * *